United States Patent [19]
Bickley et al.

[11] Patent Number: 5,519,403
[45] Date of Patent: May 21, 1996

[54] GLOBAL POSITIONING SYSTEM COMMUNICATIONS MULTI-INTERFACE

[75] Inventors: Robert H. Bickley, Paradise Valley; Leland L. Moy, Scottsdale; David M. Yee, Scottsdale; Theodore W. Keller, Scottsdale; Roy W. Sikorski, Scottsdale, all of Ariz.

[73] Assignee: Motorola, Inc., Schaumburg, Ill.

[21] Appl. No.: 158,886

[22] Filed: Nov. 29, 1993

[51] Int. Cl.⁶ .................................................. H04B 7/185
[52] U.S. Cl. ................... 342/352; 342/357; 364/DIG. 1; 364/238.3; 364/240.5
[58] Field of Search ................................. 342/357, 352; 364/238.3, 240.5

[56] References Cited

U.S. PATENT DOCUMENTS

| | | | |
|---|---|---|---|
| 4,112,421 | 9/1978 | Freeny, Jr. | 343/112 D |
| 5,043,736 | 8/1991 | Darnell et al. | 342/357 |
| 5,055,851 | 10/1991 | Sheffer | 342/457 |
| 5,119,102 | 6/1992 | Barnard | 342/357 |
| 5,119,504 | 6/1992 | Durboraw, III | 455/54 |

FOREIGN PATENT DOCUMENTS

| | | | |
|---|---|---|---|
| 0123562 | 10/1984 | European Pat. Off. | G01S 5/02 |
| 0242099 | 10/1987 | European Pat. Off. | G01S 5/14 |
| 8912835 | 12/1989 | WIPO | G01S 5/02 |

*Primary Examiner*—Gregory C. Issing
*Attorney, Agent, or Firm*—Jeffrey D. Nehr

[57] ABSTRACT

A Global Positioning System (GPS) communications includes a GPS receiver for generating position information, a processor coupled to the GPS receiver by a bus, and a communications multi-interface coupled to both the GPS receiver and to the processor by the bus. The processor presents the position information to the communications multi-interface capable of interfacing with a wide variety of communications systems. Described applications include guided weapons systems, interrogatable tag systems, collision avoidance systems, remote locator/responder systems, beacon location systems, search and rescue transceiver systems, location reporting pager systems, and cellular telephone location systems.

2 Claims, 7 Drawing Sheets

GLOBAL POSITIONING SYSTEM COMMUNICATIONS MULTI-INTERFACE

FIELD OF THE INVENTION

This invention relates in general to Global Positioning Systems (GPS) and communications and in particular to a GPS communications multi-interface.

BACKGROUND OF THE INVENTION

Positioning systems have historically been based upon many different technologies, but always have been used exclusively to determine the location of the user. Throughout history, ship captains and cross country explorers determined their direction of travel using the sun, stars, and geophysical features. Further invention and development improved upon the sophistication and accuracy of positioning aids. Mechanical devices such as the compass for direction finding were developed. The sextant was a significant improvement for location determination at sea. The age of electronics has provided radio positioning apparatus to better and more reliably determine a user's location. OMEGA, VOR, RADAR, TACAN, TRANSIT, LORAN, and recently the Global Positioning System (GPS) have achieved ever increasing accuracy in positioning.

All of the above modern positioning devices, or systems, share a common deficiency. The systems determine the location of those using them and provide no further function. The most accurate positioning technology available today, GPS, can pinpoint a user to within a few meters anywhere on the face of the earth, but only the GPS user knows this location information. Frequently, what is needed is for someone else, at another site, to know the precise location of the positioning system's user. For example, if the location of an automobile accident is only known by those at a crash site, how does an emergency medical technician helicopter know where to go to aid the victim? What is needed is an apparatus for reporting accurate GPS location of an unknown site to other locations involved in an application.

Some positioning scenarios require the location of an unmanned remote site to be reported to a manned location for monitoring and/or management of future action. In such an example, the remote site may be uninhabitable for some environmental reason (as at the edge of an active volcano), thereby prohibiting a user from operating the GPS positioning system and reporting the user's location. Such critical data may be needed to predict where to evacuate people in endangered areas based upon location. What is needed is to know the remote site's location at a second location.

Similar positioning systems needs occur in search and rescue operations. For example, an automatic emergency GPS positioning system operating on a sinking vessel with unconscious people aboard is of little use unless the location of the vessel can be delivered to a rescue party. Precious time can be lost before a person may be able to communicate the vessel's location. A method to automatically transmit the location data would be invaluable.

The above examples are representative of the myriad of possible applications of an apparatus to facilitate the transmission of GPS location data from an unknown location to another control, monitor, or action site or multiple sites. Since a constraint on such a transmission is the environment separating the sites, a variety of methods and apparatus are required to satisfy all the constraints. The apparatus used to connect the GPS positioning system must be capable of interfacing with a variety of communications equipment, singly or in combination, to achieve operating flexibility with any communications hardware having common interface characteristics.

SUMMARY OF THE INVENTION

Accordingly, it is an advantage of the present invention to provide a new and improved apparatus for providing a flexible, adaptable interface between the Global Positioning System (GPS) and a variety of communications systems.

To achieve these advantages, a Global Positioning System (GPS) communications multi-interface is contemplated which includes a GPS receiver for generating position information, a processor coupled to the GPS receiver by a bus, and a communications multi-interface coupled to both the GPS receiver and to the processor by the bus. The processor presents the position information to the communications multi-interface capable of interfacing with a wide variety of communications systems.

The above and other features and advantages of the present invention will be better understood from the following detailed description taken in conjunction with the accompanying drawings.

DETAILED DESCRIPTION OF THE PREFERRED EMBODIMENT

Figure 1:
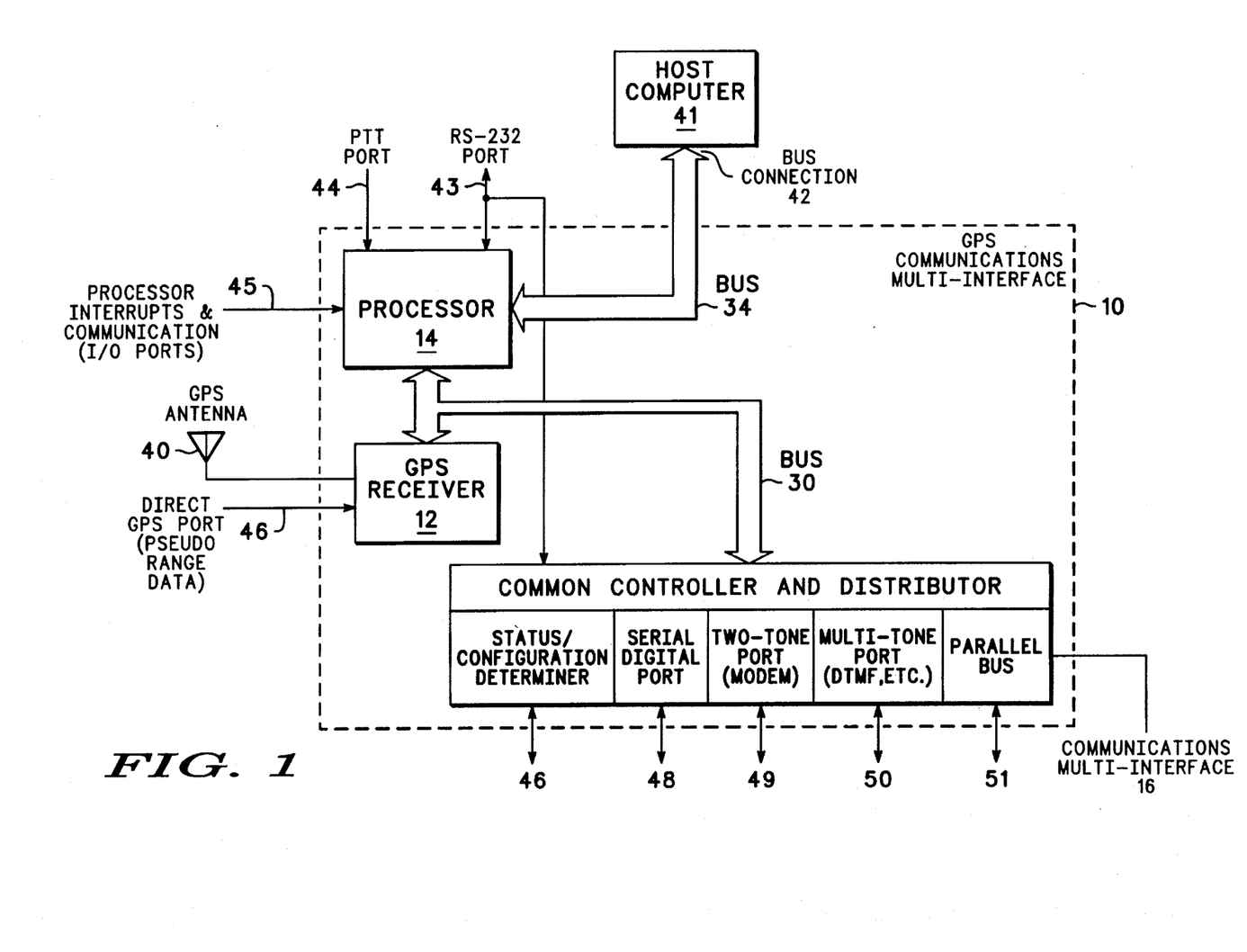
FIG. 1 illustrates a schematic of a GPS communications multi-interface in accordance with the preferred embodiment of the invention.

The GPS communications multi-interface 10 in FIG. 1 is comprised of a processor 14, a GPS receiver 12, and a communications multi-interface 16. The processor 14, the GPS receiver 12, and the communications multi-interface 16 are interconnected by a processor level bus 30 for internal communications and control. A similar processor level bus 34 is provided for communications to a host computer or processor 41 at bus connection 42.

Processor 14 has available a number of input/output (I/O) ports and interrupts 45 which may be used in a conventional manner. The processor 14 also has a designated push-to-talk (PTT) port 44 for transmitter control, and a RS-232 port 43 to provide direct communications, should a system design require it. Processor 14 may be any processor or controller including the processor physically resident in GPS receiver 12.

GPS receiver 12 is coupled to a GPS antenna 40 in a conventional manner through a low noise amplifier (LNA) equipped unit of about 26 dB gain in the preferred embodiment. The LNA is powered through an RF cable in a manner common to the technology. Other designs may be used with variations in available GPS receiver design. GPS receiver 12 may be any GPS configuration having L-band frequencies $L_1$ of 1575.42 MHz to $L_2$ of 1227.6 MHz, clear access (CA), precise code/encrypted code (P/Y), data encryption, differential GPS, or any workable combination. A direct GPS port 46 is provided as input to GPS receiver 12 for communicating GPS pseudo range data from another differential receiver by any suitable communications means.

A plurality of ports to the communications multi-interface 16 of FIG. 1 are provided to allow configuration of the GPS communications multi-interface 10 for nearly any possible communications protocol now or future. Communications multi-interface 16 comprises common controller and distributor 17, status/configuration determiner 47, and serial digital port 48, two-tone (modem) port 49, multi-tone (DTMF, etc.) port 50, and parallel bus 51. Serial digital port 48 provides serial bit stream data of configurable amplitude and ratio to carry bi-directional data stream input/output from the GPS communications multi-interface 16. Two-tone (modem) port 49 provides two-tone sequential modem-type protocols of configurable amplitude, phase, frequency, and rate to carry a data stream input/output to the communications multi-interface 16. Multi-tone port 50 provides multiple tone simultaneous protocols of configurable amplitude, frequency combination, and rate to carry a data stream input/output to the communications multi-interface 16. Parallel bus port 51 provides a parallel bus of configurable width, amplitude, and rate to carry data input/output to communications multi-interface 16.

Serial digital port 48 denotes a plurality of interface specifications such as RS-232, RS-422, etc. Two-tone (modem) 49 port handles two-tone modem communications. Multi-tone port 50 handles two or more simultaneous tone communications, such as DTMF, etc. Parallel bus 51 handles communications in an interface format such as 1553, Centronix, AT, etc.

Communications multi-interface 16 routes data bi-directionally in a bus based format conversion process. Data may be handled simultaneously or separately over the four classes of communication protocol and be sent in any one of a number of specific formats within each class. The communications multi-interface 16 also provides information as to what its correct settings are through status/configuration determiner 47. The communications multi-interface 16 can be dynamically reconfigured under control of an internal or external processor, such as processor 14, and can provide any and all data, configuration, and control over processor bus 30. Communications multi-interface 16 may contain normal processor 14 communications paths such as I/O interrupts, and RS-232 as well.

When interfaced to a radio, the modem or data formats of communications multi-interface 16 are to be selected as compatible with the total radio communication system. The GPS communications multi-interface 10 processor 14 can even provide control in many cases over a non-computer controlled radio. The radio used in a communications system can be AM, FM, spread spectrum, microwave, light or laser beam in free or fiber optic, line of sight, reflected, satellite, secure or non-secure, or any type of communications between two points that the application or state-of-the-art may allow.

The GPS communications multi-interface 10 data configurations in FIG. 1 can include any data stream form or protocol at any data rate technically achievable by the chosen semiconductor technology. Such data configurations may be comprised of serial, parallel, two-tone, or multiple-tone combinations with controlled amplitude, timing, rates, and frequencies.

Figure 2:
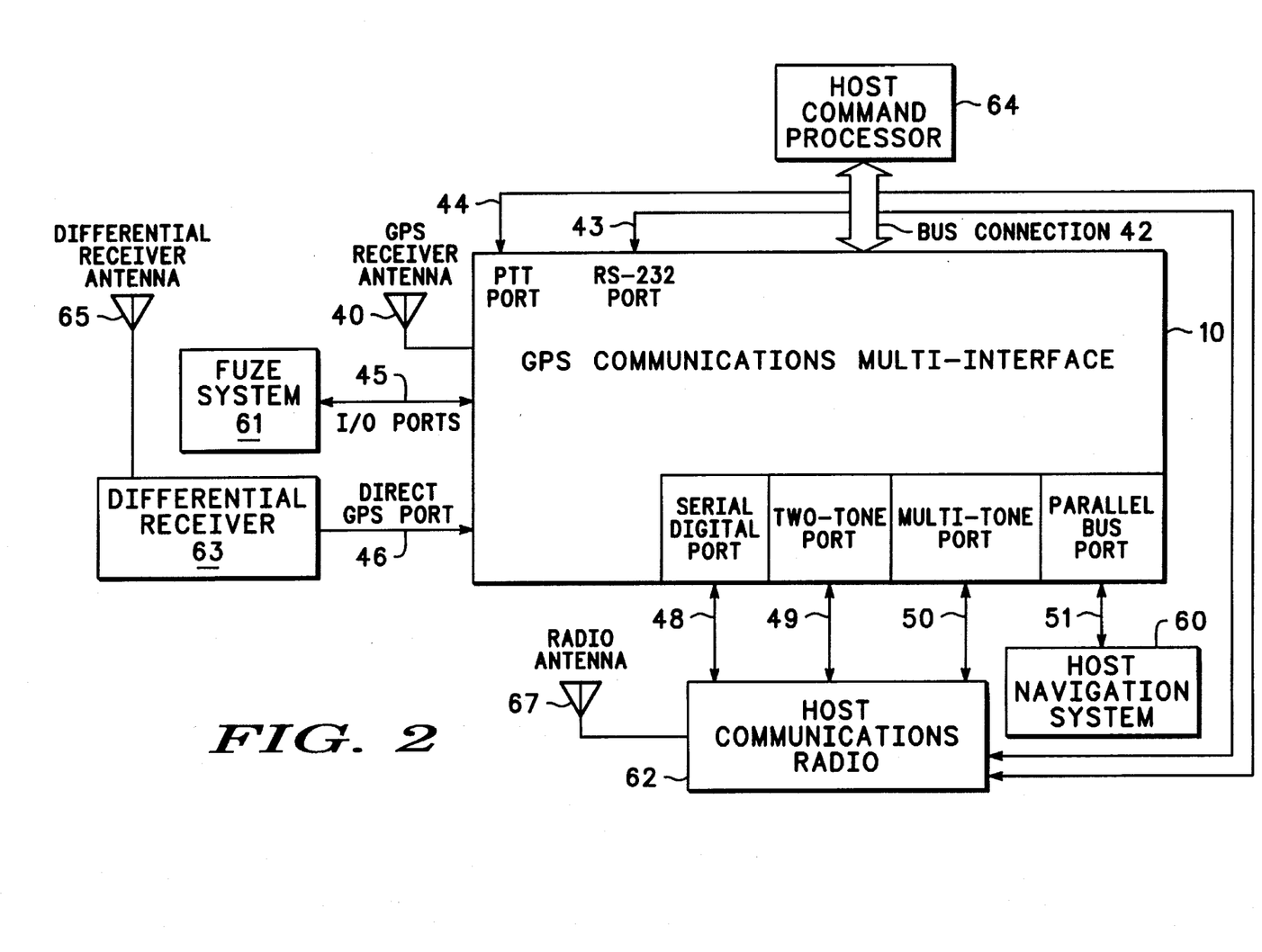
FIG. 2 illustrates a schematic of a guided weapons system using the GPS communications multi-interface of FIG. 1.

FIG. 2 illustrates a schematic of a guided weapons system using GPS communications multi-interface 10 from FIG. 1. The guided weapons system in FIG. 2 comprises GPS communications multi-interface 10, host navigation system 60, host communications radio 62, differential receiver 63, fuze system 61, and host command processor 64. The GPS communications multi-interface 10 is coupled through parallel bus port 51 to host navigation system 60. Host communications radio 62 may be coupled through serial digital port 48 or two-tone port 49 or multi-tone port 50 to GPS communications multi-interface 10. Radio antenna 67 provides a signal to host communications radio 62. Host communications radio 62 is also coupled to the PTT port 44 and to the RS-232 port 43 of GPS communications multi-interface 10.

Fuze system 61 is coupled through I/O ports 45 to GPS communications multi-interface 10. Differential receiver 63 is coupled to GPS communications multi-interface 10 through direct GPS port 46. Differential receiver antenna 65 provides a signal to differential receiver 63. Host command processor 64 is coupled to GPS communications multi-interface 10 through bus connection 42.

GPS communications multi-interface 10 provides continuous position updates to the host navigation system 60 through parallel bus port 51. The GPS used may be clear access (CA) or precise code/encrypted code (P/Y). An additional receiver, differential receiver 63, can be used for differential GPS applications. The communications multi-interface 10 may be modified or updated by host command processor 64.

Fuze system 61 provides safety backup to detonation based on signals input via I/O ports 45. Host communications radio 62 may respond to interrogation in any selected data format through the serial digital port 48, the two-tone port 49, or the multi-tone port 50. The host communications radio 62 may also communicate directly to processor 14 via RS-232 port 43. Host communications radio 62 may provide RS-232 port differential pseudo code information via serial digital port 48. Host communications radio 62 may also pass updates of GPS communications multi-interface 10 conditions or commands over any of the other interface paths shown in FIG. 2.

Figure 3:
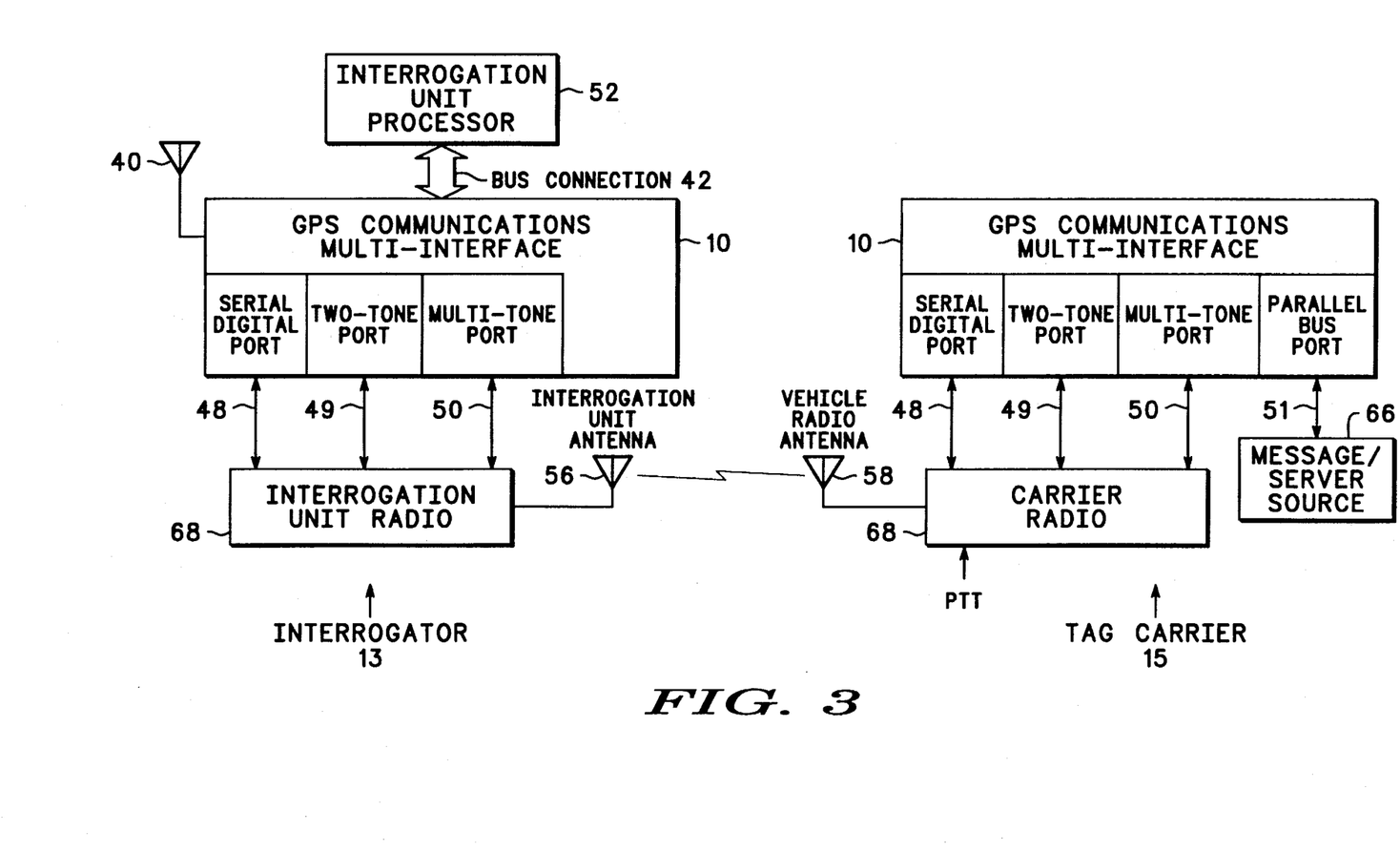
FIG. 3 illustrates a schematic of an interrogatable tag system using the GPS communications multi-interface of FIG. 1.

FIG. 3 illustrates an interrogatable tag system using the GPS communications multi-interface 10 of FIG. 1. FIG. 3 illustrates an interrogator 13 and a tag carrier 15. The interrogator 13 comprises an interrogation unit processor 52 which is coupled to a GPS communications multi-interface 10 through bus connection 42. GPS antenna 40 provides an input GPS signal to GPS communications multi-interface 10. GPS communications multi-interface 10 is also coupled through serial digital port 48 or two-tone port 49 or multi-tone port 50 to interrogation unit radio 54. Interrogation unit radio 54 can send an interrogation signal (and receive a response signal) through interrogation unit antenna 56.

Tag carrier 15 comprises a GPS communications multi-interface 10 coupled to both a carrier radio 68 and a message/server source 66. Vehicle radio antenna 58 provides a received interrogation signal from interrogator 13 to carrier radio 68. Carrier radio 68 also receives a PTT input. GPS communications multi-interface 10 in the tag carrier 15 is coupled to carrier radio 68 via serial digital port 48 or two-tone port 49 or multi-tone port 50. The message/server source 66 is coupled to GPS communications multi-interface 10 through parallel bus port 51.

The interrogatable tag system shown in FIG. 3 can be used to provide identification, location/position data, and message transfer by radio interrogation. Applications include tracking and monitoring of ground vehicles (e.g., police, taxi, truck, tractors), aircraft, ships, airport assets, warehouse assets, dockside assets, harbor assets, and military applications such as interrogatable friend or foe (IFF) systems. The interrogatable tag system handles existing digital and voice communication through the interrogator 13 communicating with tag carder 15 in FIG. 3. The interrogation unit processor 52 interfaced through the GPS communications multi-interface 10 of interrogator 13, triggers an interrogation signal radioed by interrogation unit radio 54. Carrier radio 68 of tag carrier 15 responds to the interrogation signal received through vehicle radio antenna 58 by providing a message from the message/server source 66. The GPS communications multi-interface 10 in tag carrier 15 provides the appropriate configuration interface between message/server source 66 and carrier radio 68 in the tag carrier 15. Similarly, GPS communications multi-interface 10 in interrogator 13 provides a suitable configuration interface between interrogation unit processor 52 and interrogation unit radio 54 in interrogator 13.

Figure 4:
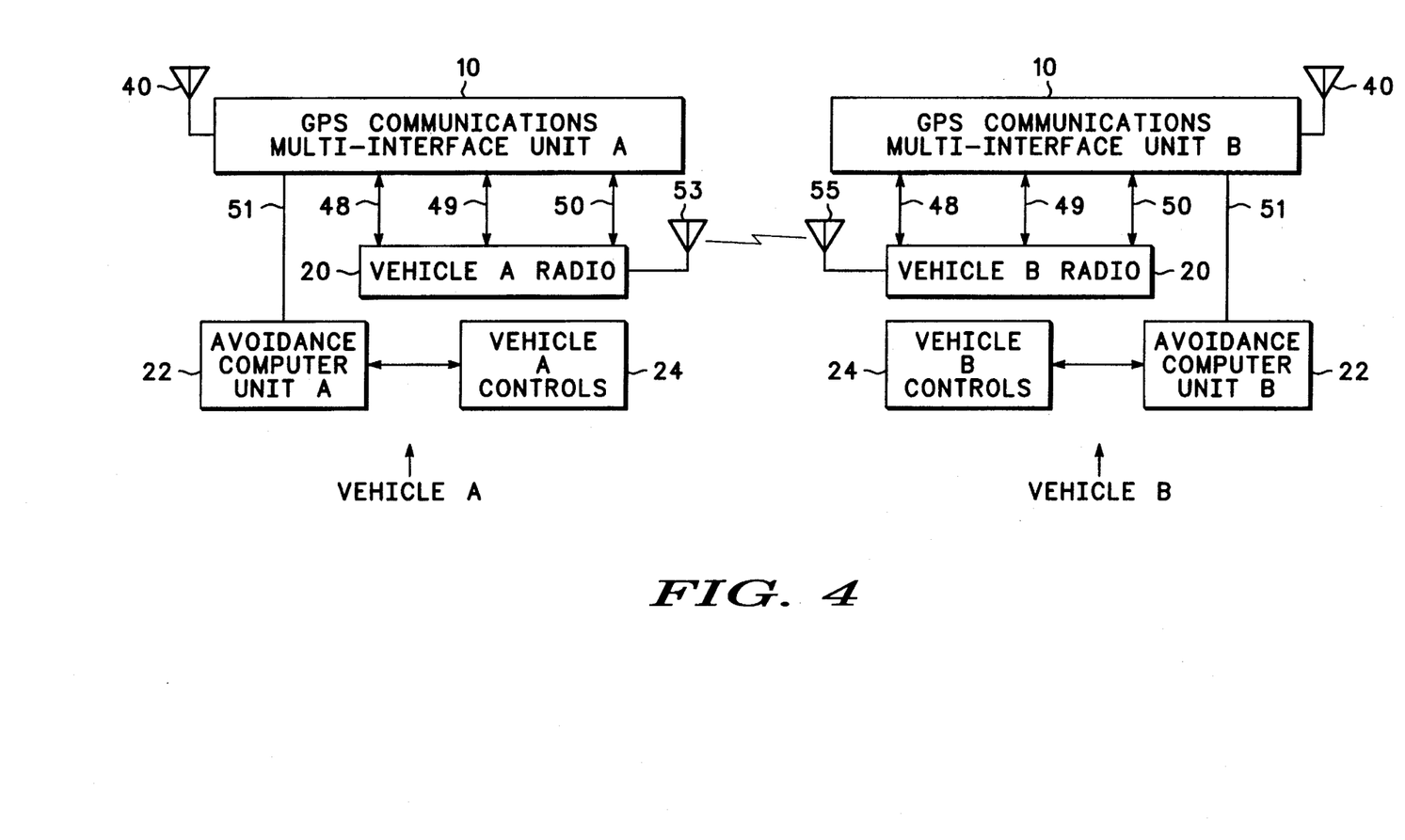
FIG. 4 illustrates a schematic of a collision avoidance system using the GPS communications multi-interface of FIG. 1.

FIG. 4 illustrates a collision avoidance system using the GPS communications multi-interface 10 of FIG. 1. FIG. 4 illustrates a vehicle A system and a vehicle B system. The vehicle A system comprises a GPS communications multi-interface unit A 10 which receives a GPS signal from GPS antenna 40. The GPS communications multi-interface unit A 10 is coupled to vehicle A radio 20 via serial digital port 28, two-tone port 49, or multi-tone port 50. The vehicle A radio 20 sends or receives a signal through vehicle A radio antenna 53. GPS communications multi-interface unit A 10 is coupled through parallel bus 51 to avoidance computer unit A 22. Avoidance computer unit A 22 is coupled to vehicle A control system 24.

Structurally, the vehicle B portion of the collision avoidance system is identical to that for vehicle A. The vehicle B portion of the collision avoidance system comprises GPS communications multi-interface unit B 10, vehicle B radio 20, vehicle B radio antenna 55, vehicle B control system 24, and avoidance computer unit B 22. The like reference numbered elements of the vehicle B portion are directly analogous and coupled identically to their vehicle A counterparts described above.

The collision avoidance system illustrated in FIG. 4 can be used to provide identification and location/position data on any aircraft, land, marine, or other vehicle in order to prevent a collision. Applications, for example, include collision avoidance for airborne aircraft, automobiles, ships, taxiing aircraft, and trains. The collision avoidance system in FIG. 4 can handle both digital and voice communication.

In function, vehicle A radio 20 and vehicle B radio 20 communicate with one another through their respective antennas 53 and 55. GPS communications multi-interface unit A 10 provides the appropriate interface between avoidance computer A 22 and vehicle A radio 20. Similarly, GPS communications multi-interface unit B 10 provides an appropriate interface between avoidance computer unit B 22 and vehicle B radio 20. Avoidance computer unit A 22 and avoidance computer unit B 22 provide the intelligence, according to predetermined algorithms, to determine danger conditions regarding potential collisions between vehicle A and vehicle B. Avoidance computer unit A 22 then provides appropriate evasive input data to vehicle A control system 24 and avoidance computer unit B 22 provides coordinated guidance to vehicle B control system 24 for vehicle B.

Figure 5:
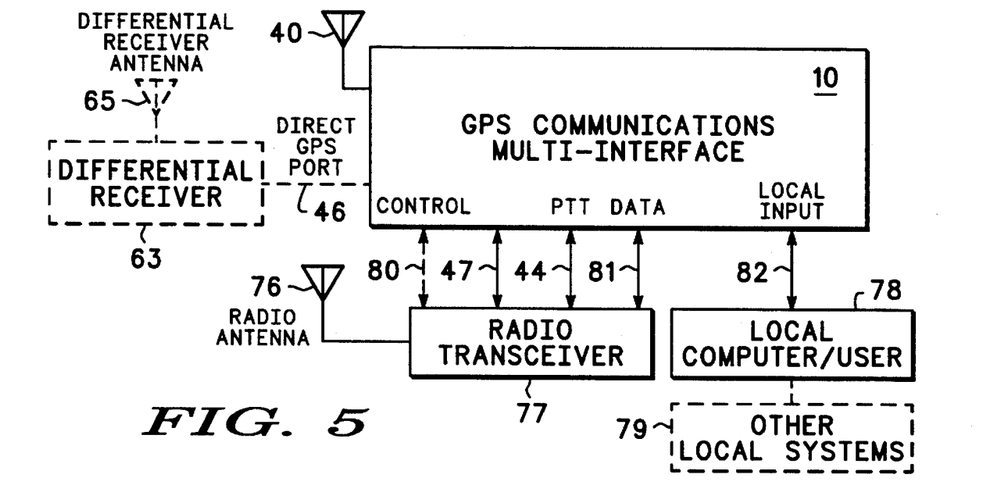
FIG. 5 illustrates a schematic of a remote locator/responder system using a GPS communications multi-interface as in FIG. 1.

FIG. 5 illustrates a remote locator/responder system using a GPS communications multi-interface 10 in FIG. 1. The FIG. 5 remote locator/responder system may be a satellite system. The remote locator/responder system in FIG. 5 comprises GPS communications multi-interface coupled to radio transceiver 77 via control line 80, PTT 44, status/ configuration determiner 47 and data line 81. The GPS communications multi-interface 10 is also coupled via local input 82 to local computer/user 78. As an optional addition, other local systems 79 may be coupled to local computer/ user 78. A second option, is to have differential receiver 63 coupled to GPS communications multi-interface 10 via direct GPS port 46. Differential receiver 63 would require differential receiver antenna 65 as well. GPS communications multi-interface 10, as before, receives its input signal via GPS antenna 40. Radio antenna 76 is coupled to radio transceiver 77.

The FIG. 5 remote locator/responder system uses an interrogator which may interrogate the remote responder (or other interrogator) using either line-of-sight (LOS) communicator if direct radio-to-radio contact is achievable, or any suitable satellite link using single or multiple hops. Using line-of-sight to communications is workable over a few hundred kilometers. Single hop communications is workable over thousands of kilometers. Multiple hop communications allows one user to cover the entire earth's surface.

The remote locator/responder system in FIG. 5 integrates any radio transceiver 77 suitable for line-of-sight or satellite communications with the GPS communications multi-interface 10 and a local computer/user 78 (including display and keyboard). The result is a device with the ability to command the GPS communications multi-interface 10 to interrogate any other specific identification (location) or group of identifications, to determine their specific locations, heights, velocities, and directions, and to perform computations of relative positions to or between them, including locating them on a map. Such information gathered or computed may then be passed electronically to other systems as needed, either by the GPS communications multi-interface 10 or by the local computer/user 78. Such information may be recorded or stored by the local computer 78. The use of the local computer 78 allows for programmed or automated interrogation and short message services are also possible.

The remote locator/responder system unit in FIG. 5 may also be configured as a personal or vehicular autonomous GPS. Such a system would respond to interrogations from remote unit interrogators, but would itself not be able to interrogate. Such a system could be used to send preloaded short messages when interrogated, however.

The FIG. 5 remote locator/responder system is usable in such applications as urban helicopter air traffic control, or directing aircraft to emergency or other locations. The FIG. 5 system is applicable to any case where an aircraft needs to be directed to any point on the ground or over water. The radio transceiver 77 may be an existing ACT, FM, or tactical radio, or other radio compatible with the ground counterpart. The system as used on the ground may use a second identical unit, or a portable system.

In use, the FIG. 5 remote locator/responder system involves an aircraft which may interrogate for location to go to, or the ground may interrogate for location of aircraft and pass such a request message with the interrogation. Voice capability is also available using the radio transceiver 77. Also, the ground may transmit location data for any aircraft to display. A central command center may be used to display all traffic with another unit and provide overall control.

Figure 6:
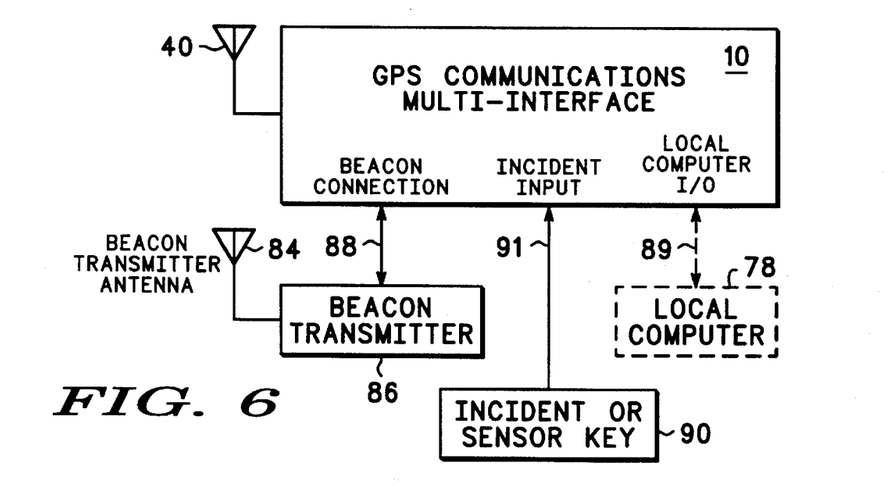
FIG. 6 illustrates a schematic of a beacon location system using a GPS communications multi-interface as in FIG. 1.

FIG. 6 illustrates a beacon locator system using a GPS communications multi-interface 10 as in FIG. 1. The beacon locator system in FIG. 6 comprises beacon transmitter 86 to which a signal from beacon transmitter antenna 84 is input. Beacon transmitter 86 is coupled to GPS communications multi-interface 10 via beacon connection 88. An incident or sensor key input 90 becomes incident input 91 to GPS communications multi-interface 10. An optional local computer 78 is coupled to GPS communications multi-interface 10 through local computer I/O 89. As before, GPS antenna 40 supplies GPS input to GPS communications multi-interface 10.

The beacon locator system in FIG. 6 is used to provide identification, location/position or sensor data on a beacon transmitter system. Applications include a variety of satellite systems for search and rescue, including COSPAS-SARSAT (search and rescue satellite), (at 406.025, 121.5 or 243 MHz), emergency position indicating radio beacon (EPIRB) for maritime BUOY, emergency location beacon-aircraft (ELBA), emergency location transmitter (ELT), personal location beacon (PLB), and search and rescue (SAR).

In function, the FIG. 6 beacon locator system provides a transmitted beacon signal in response to an incident input 91 from the incident or sensor key 90. GPS information is loaded onto the beacon transmitter 86 signal which is reformatted for transmission. The local computer 78 connection is optional and can be used to provide additional message information.

Figure 7:
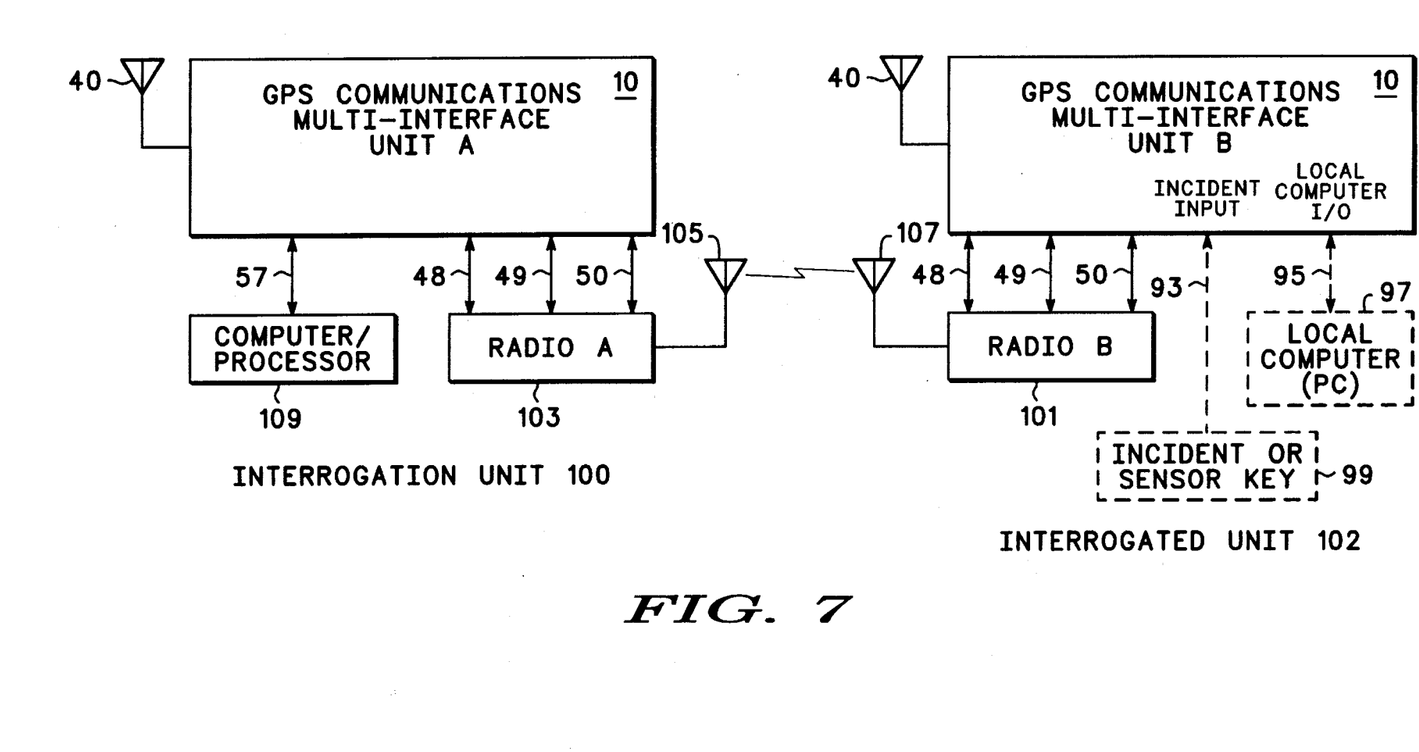
FIG. 7 illustrates a search and rescue transceiver system using a GPS communications multi-interface as in FIG. 1.

FIG. 7 illustrates a search and rescue transceiver system using a GPS communications multi-interface as in FIG. 1. The FIG. 7 search and rescue transceiver system comprises an interrogation unit 100 and an interrogated unit 102. GPS communications multi-interface unit A 10 receives input from GPS antenna 40 in interrogation unit 100. Computer/processor 109 is coupled through parallel bus 51 to GPS communications multi-interface unit A 10. Radio A 103 is coupled through serial digital port 48 or two-tone modem port 49 or multi-tone port 50 to GPS communications multi-interface unit A 10. Radio A antenna 105 is coupled to radio A 103.

The interrogated unit 102 of FIG. 7 comprises a GPS communications multi-interface unit B 10 which receives input from GPS antenna 40, and additionally comprises radio B 101 and potentially, incident or sensor key 99 and local computer (PC) 97. Radio B 101 of interrogated unit 102 is coupled through serial digital port 48 or two-tone modem port 49 or multi-tone port 50 to GPS communications multi-interface unit B 10. Radio B antenna 107 is coupled to radio B 101. If present, incident or sensor key 99 is coupled through incident input 93 to GPS communications multi-interface unit B 10. Also, local computer (PC) 97 may be coupled to GPS communications multi-interface unit B 10 through local computer I/O 95.

The FIG. 7 search and rescue transceiver system is used to provide identification, location/position, message transfer, etc. for search and rescue radio. Applications include search and rescue radio for radios such as the Motorola PRC 112, LST-SC satellite radio (SATCOM), URC-200 line-of-sight (LOS) radio, and applies to terrestrial search and rescue (eg. for hikers), downed aircraft and vessels in distress. The search and rescue transceiver system handles both voice and data communications.

In function, an incident or sensor key 99 causes an incident input 93 to be sent to GPS communications multi-interface unit B 10 in the interrogated unit 102. The GPS communications multi-interface unit B 10, in response to the incident input 93, and potentially along with information from local computer 97 (through local computer I/O 95) causes radio B 101 to send a signal to radio A 103. The radio A 103 received signal proceeds through serial digital port 48 or two-tone port 49 or multi-tone port 50 to GPS communications multi-interface unit A 10 within the interrogation unit 100. The computer/processor 109 of interrogation unit 100, through parallel bus 51, and GPS communications multi-interface unit A 10, can direct radio A 103 to send update location request messages, position information, or other relevant information to radio B 101. The interrogated unit 102 of FIG. 7 can continue to update interrogated unit 102 position information and/or additional message information from local computer 97 to the interrogation unit 100.

Figure 8:
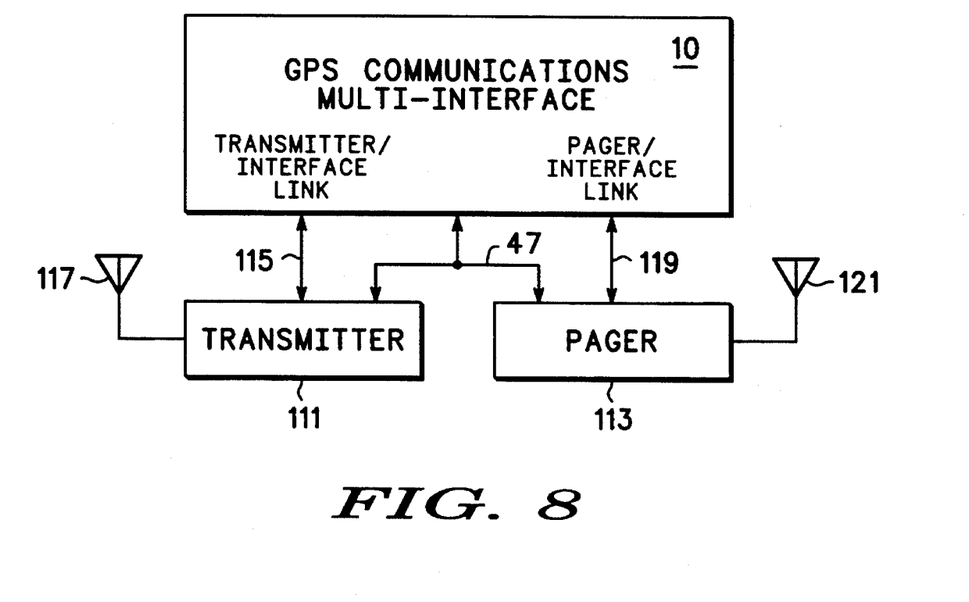
FIG. 8 illustrates a location reporting pager system using a GPS communications multi-interface as in FIG. 1.

In FIG. 8 there is an illustration of a location reporting pager system using a GPS communications multi-interface 10 as in FIG. 1. The location reporting pager system of FIG. 8 comprises a GPS communications multi-interface 10 coupled through transmitter/interface link 115 to transmitter 111. Transmitter 111 receives input from transmitter antenna 117. GPS communications multi-interface 10 is also coupled to transmitter 111 via status/configuration determiner connection 47. The GPS communications multi-interface 10 is coupled to pager 113 via status/configuration determiner connection 47 as well as pager/interface link 119. Pager 113 receives an input from pager antenna 121.

The FIG. 8 location reporting pager system allows configuration of a simple responder to be interrogated over a pager system to report GPS information and any locally generated short message through any selected transmitter 111. Applications include tracking of trucks, boats, railroad or other rolling stock, and local data sources (for example valve conditions). In simplest form, the location reporting pager system could be used as a personal device.

Figure 9:
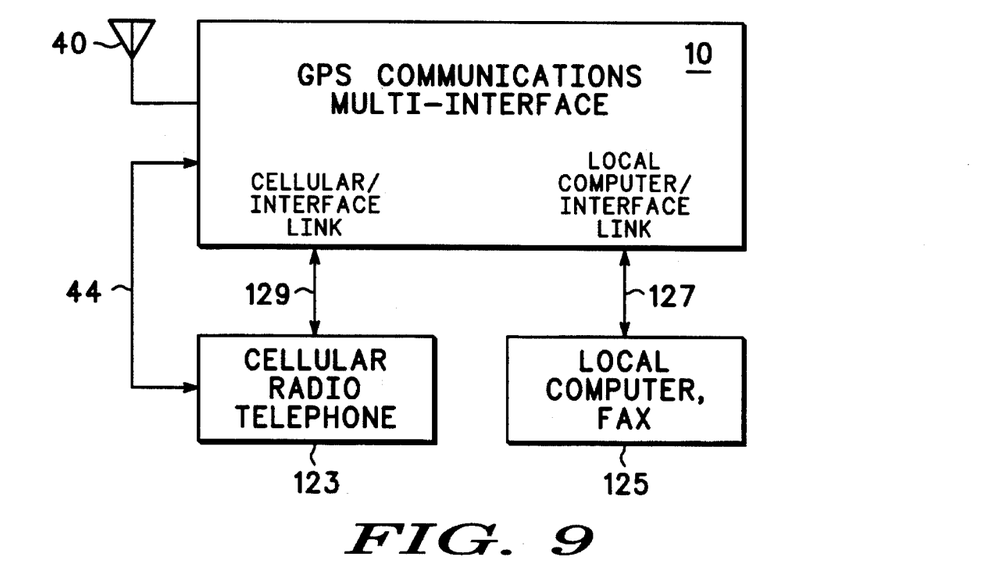
FIG. 9 illustrates a cellular location system using a GPS communications multi-interface as in FIG. 1.

In FIG. 9 there is illustrated a cellular location system using the GPS communications multi-interface 10 as in FIG. 1. The FIG. 9 cellular location system comprises a cellular unit 123 coupled to GPS communications multi-interface 10 via both a cellular/interface link 129 and a PTT connection 44. The cellular/interface link 129 can comprise connection through the serial digital port 48, two-tone (modem) port 49, multi-tone port 50, or parallel bus 51 of FIG. 1. A local computer or fax 125 is coupled to GPS communications multi-interface 10 through local computer/interface link 127.

The cellular unit 123 and the FIG. 9 cellular location system can be a terrestrial cellular radio telephone or a satellite cellular radio telephone, such as that used in the IRIDIUM™ system. The cellular interface link 129 may be through any of the communications multi-interface ports, i.e. the serial digital port 48, the two-tone (modem) port 49, the multi-tone port 51, or the parallel bus port 51 of the GPS communications multi-interface 10. The cellular 5 location system in FIG. 9 can configure special communications either serially or as dictated by cellular phone processor requirements. The cellular location system can be used to provide identification and location/position information via a telephone call. The location/position data can be sent with each transmission incoming ring. Additional uses include computer data transmission, facsimile (fax), or any other data transmission over the telephone link, depending on port configurations.

The satellite version of the cellular phone location system could be used to respond to a phone sent interrogation to report location and other stored information. The GPS communications multi-interface 10 may be programmed to respond with such location information based upon a ground unit initialization (such as that used for billing and tariff determination based upon country of origin of the call or other location based criteria).

Thus, a GPS communications multi-interface method and apparatus has been described which overcomes specific problems and accomplishes certain advantages relative to prior art methods and mechanisms. The improvements over known technology are significant. The GPS communications multi-interface is suitable for applications guided weapons systems, interrogatable tag systems, collision avoidance systems, remote locator/responder systems, beacon locator systems, search and rescue transceiver systems, location reporting pager systems, and cellular location systems.

Thus, there has been provided, in accordance with the preferred embodiments of the invention, a GPS communications multi-interface method and apparatus that fully satisfies the aims and advantages set forth above. While the invention has been described in conjunction with specific embodiments, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A Global Positioning System (GPS) communications multi-interface capable of interfacing with a plurality of communications systems, the GPS communications multi-interface comprising:

a GPS receiver for generating position information:

a processor coupled to the GPS receiver by a bus; and a communications multi-interface coupled to both the GPS receiver and to the processor by the bus, wherein the processor presents the position information to the communications multi-interface and wherein the communications multi-interface comprises:

a status/configuration determiner having a status/configuration input/output;

a two-tone modem interface having a receive, transmit audio input/output;

a serial digital interface having a serial digital input/output;

a multi-tone modem interface having a multi-tone input/output;

a bus parallel interface having a bus parallel input/output; and a common controller coupling each of the status/configuration determiner, the two-tone modem interface, the serial digital interface, the multi-tone interface, and the bus parallel interface to the bus.

2. A GPS communications multi-interface as claimed in claim 1, wherein the GPS communications multi-interface further comprises:

a push-to-talk (PTT) input/output coupled to the processor; and a RS-232 input/output coupled to both the processor and to the common controller.

* * * * *